(12) United States Patent
Wind

(10) Patent No.: US 11,554,672 B2
(45) Date of Patent: Jan. 17, 2023

(54) DISCHARGING DEVICE, ELECTRICAL UNIT AND DISCHARGING METHOD

(71) Applicant: Brose Fahrzeugteile SE & Co. Kommanditgesellschaft, Würzburg, Würzburg (DE)

(72) Inventor: Christian Wind, Landsberg am Lech (DE)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 117 days.

(21) Appl. No.: 16/970,984

(22) PCT Filed: Feb. 18, 2019

(86) PCT No.: PCT/EP2019/053955
§ 371 (c)(1),
(2) Date: Aug. 19, 2020

(87) PCT Pub. No.: WO2019/158748
PCT Pub. Date: Aug. 22, 2019

(65) Prior Publication Data
US 2021/0008983 A1 Jan. 14, 2021

(30) Foreign Application Priority Data

Feb. 19, 2018 (DE) ...................... 10 2018 202 509.6
Feb. 20, 2018 (DE) ...................... 10 2018 202 579.7
May 25, 2018 (DE) ...................... 10 2018 208 292.8

(51) Int. Cl.
*B60L 3/04* (2006.01)
*H02H 9/00* (2006.01)
*H02H 9/02* (2006.01)

(52) U.S. Cl.
CPC ............... *B60L 3/04* (2013.01); *H02H 9/001* (2013.01); *H02H 9/02* (2013.01)

(58) Field of Classification Search
CPC ...... B60L 3/04; B60L 2240/36; B60L 3/0046; B60L 3/0069; H02H 9/001; H02H 9/02;
(Continued)

(56) References Cited

U.S. PATENT DOCUMENTS 6,021,037 A 2/2000 Hasler
2003/0053322 A1 3/2003 Chiu
(Continued)

FOREIGN PATENT DOCUMENTS

CN 101971449 A 2/2011
CN 102263400 A 11/2011
(Continued)

OTHER PUBLICATIONS

Wikipedia—Thermistor https://en.wikipedia.org/wiki/Thermistor.

*Primary Examiner* — Lincoln D Donovan
*Assistant Examiner* — Alex W Lam
(74) *Attorney, Agent, or Firm* — Brooks Kushman P.C.

(57) ABSTRACT

A discharging circuit includes a current limiting resistor, a first switch configured to connect a component to be discharged on an electrical network to a reference potential indirectly via the current limiting resistor, and a limiting circuit configured to be arranged on a control connection side of the first switch and is configured to limit heating that occurs at the first switch or at the current limiting resistor in a discharging mode, wherein the limiting circuit includes a thermistor thermally coupled to the first switch or to the current limiting resistor.

11 Claims, 2 Drawing Sheets

(58) Field of Classification Search
CPC ........ B60R 16/005; B60R 16/02; H02M 1/32; H02M 1/322
See application file for complete search history.

(56) References Cited

U.S. PATENT DOCUMENTS

| | | |
|---|---|---|
| 2011/0057627 A1 | 3/2011 | Kuehner |
| 2013/0002209 A1* | 1/2013 | Voegele .................. H02M 1/32 |
| | | 320/166 |
| 2013/0257446 A1* | 10/2013 | Soell ......................... B60L 3/04 |
| | | 324/503 |
| 2014/0070751 A1 | 3/2014 | Niwa et al. |
| 2016/0374168 A1* | 12/2016 | Ackmann ............... H05B 45/14 |

FOREIGN PATENT DOCUMENTS

| | | |
|---|---|---|
| CN | 102666180 A | 9/2012 |
| CN | 205986243 U | 2/2017 |
| DE | 2516825 A1 | 10/1976 |
| DE | 102012204866 A1 | 10/2013 |
| DE | 102013014609 A1 | 3/2014 |
| EP | 0477908 A2 | 4/1992 |
| EP | 2639916 A2 | 9/2013 |
| EP | 2639949 A1 | 9/2013 |
| EP | 3182572 A1 | 6/2017 |
| JP | H04145374 A | 5/1992 |
| JP | H05111178 A | 4/1993 |
| JP | H099497 A | 1/1997 |
| JP | 2008206313 A | 4/2008 |
| JP | 2014146634 A | 8/2014 |
| JP | 2016086578 A | 5/2016 |

\* cited by examiner

DISCHARGING DEVICE, ELECTRICAL UNIT AND DISCHARGING METHOD

CROSS-REFERENCE TO RELATED APPLICATIONS

This application is the U.S. National Phase of PCT/EP2019/053955 filed Feb. 18, 2019, which claims priority to German Patent Application No. DE 10 2018 202 509.6 filed Feb. 19, 2018, DE 10 2018 202 579.7 filed Feb. 20, 2018, and DE 10 2018 208 292.8 filed May 25, 2018, the disclosures of which are hereby incorporated in their entirety by reference herein.

TECHNICAL FIELD

The disclosure relates to a discharging device for actively discharging an electrical network, in particular a high-voltage network, or an electrically operated unit of such a network. The disclosure also relates to such an electrical unit and to a discharging method.

BACKGROUND

In modern motor vehicles, in addition to the components which are usually operated with a voltage having a voltage value of 12 volts, use is often also made of components which are operated with a considerably higher operating voltage value. Such high operating voltage values may exceed 100 volts, in particular in vehicles with a fully electric drive or hybrid drive. In this case, voltage values of more than 60 volts are already referred to as "high voltage" in the automotive sector. In particular, the electrical units operated with high voltage, usually electrical drive systems which include, for example, a drive motor, a coolant or lubricant pump, an air-conditioning compressor or the like, are incorporated in this case in a so-called "high-voltage network". Such a high-voltage network usually also comprises at least one energy store (for example a capacitor) which is respectively assigned to one or all electrical units of the high-voltage network. This energy store is used, for example, to keep the operating voltage value required for the electrical unit(s) constant.

However, for safety reasons, it is necessary for such high-voltage networks to be able to be switched off, on the one hand, and to be able to be discharged, in particular, on the other hand. This is the case, in particular, when persons can come into contact with the respective high-voltage network or short circuits may occur in another manner. This is the case, for example, during vehicle maintenance or repair or, under certain circumstances, in the event of an accident. In order to enable automatic discharging, the electrical unit to be discharged or at least the assigned energy store can usually be reversibly connected to reference potential via a switch and a resistor. In this case, the switch or, in particular, the control of its control connection is often such that the switch is changed to its conductive state even in the event of an unforeseen failure of the control, with the result that the electrical unit or at least the energy store is discharged. The problem here is often the fact that the switch and/or resistor heat(s) up during discharging and, in the worst-case scenario, is/are destroyed by the temperature which occurs in the process.

SUMMARY

The disclosure is based on the object of making it possible to discharge an electrical network or an electrically operated unit of such an electrical network as safely as possible.

This object is achieved, according to the disclosure, by utilization of a discharging device for active discharging as described below. This object is also achieved, according to the disclosure, by utilization of an electrically operated unit having the features described below. In addition, the object is achieved, according to the disclosure, by utilization of a discharging method having the features described below. Advantageous embodiments and developments of the disclosure are also described below.

The discharging device according to the disclosure is used to actively discharge an electrical network, in particular a high-voltage network, or an electrically operated unit which may be part of such a high-voltage network or comprises such a network. In this case, the discharging device has a discharging circuit via which a component to be discharged of the high-voltage network (e.g., "vehicle electrical system") or of the electrically operated unit is connected to a reference potential (such as a ground potential), in particular in a discharging mode. For this purpose, the discharging circuit has a resistor, which may be referred to as a "current limiting resistor" below, and a first switch, which may be referred to as a "discharging switch" below. In this case, the discharging switch is used to connect, in particular reversibly connect, this component to be discharged to the reference potential indirectly via the current limiting resistor. That is to say, the discharging circuit is configured such that the high-voltage network or at least the electrically operated unit (in particular at least the component to be discharged) is connected in an electrically conductive manner to the reference potential via the current limiting resistor when the discharging switch is closed (that is to say is connected or turned on). The discharging device also has a limiting circuit which is arranged on the control connection side of the discharging switch, which may be conductively connected to the latter and is used to monitor and limit heating which occurs at the discharging switch and/or at the current limiting resistor in the discharging mode. In this case, the limiting circuit has an NTC thermistor, the resistance value of which consequently decreases in the heated state. In this case, this NTC thermistor is thermally coupled to the discharging switch and/or to the current limiting resistor.

The NTC thermistor may be thermally coupled only to the discharging switch.

A high-voltage network, in particular a high-voltage vehicle electrical system of a vehicle, may include a (vehicle electrical system) network which is operated with an operating voltage having a voltage value of greater than or equal to 60 volts.

The NTC thermistor may be connected in such a manner that, in the heated state of the NTC thermistor—therefore in the "highly" conductive state of the NTC thermistor, wherein a heated state is understood as meaning, in particular, a temperature value of more than 80, or more than 100, in particular more than 150 degrees Celsius—a control voltage or a control current needed to connect the discharging switch is directly or indirectly reduced. This in turn results in the reduction of a (discharge) current flowing via the discharging switch and/or in the switching off of the discharging circuit, the latter, in particular, by virtue of the discharging switch being opened on account of the lack of a sufficiently high control voltage or a sufficiently high control current.

In the discharging mode, the discharging switch and usually also the current limiting resistor heat up on account of the power loss. This may result in the failure of at least one of the two components, which in turn can result in the destruction of the high-voltage network and/or the electrically operated unit. As a result of the fact that the NTC thermistor is thermally coupled to the discharging switch and/or to the current limiting resistor, it is advantageously possible to monitor and, in particular, reduce the heat introduced into the discharging circuit before its (at least thermal) overloading. In particular, if the high-voltage network or the electrically operated unit has an energy store, for example a capacitor, as a component to be discharged, a comparatively safe discharging mode is thus enabled even if a superordinate monitoring system, in particular of the vehicle, fails.

In one embodiment, the discharging switch is formed, in particular, by a power transistor, such as an insulated-gate bipolar transistor (IGBT for short) or by a metal-oxide-semiconductor field effect transistor (MOSFET for short). In particular, the discharging switch is therefore a voltage-controlled switch. In particular, the discharging switch here has a collector or drain connection, an emitter or source connection and a gate connection, wherein the gate connection is the control connection mentioned above. The discharging switch may also be incorporated here in the high-voltage network in such a manner that the collector or drain connection is (at least indirectly) linked to that part (component) of the high-voltage network which is to be discharged or the electrically operated unit to be discharged. In this case, the emitter or source connection is preferably connected to the reference potential, in particular with the interposition of the current limiting resistor mentioned above. In this case, the voltage dropped across the current limiting resistor (in the discharging mode) has a retroactive effect on the control voltage applied to the control connection, as a result of which the discharge current flowing via the discharging switch is or has been limited in turn. Depending on the selection of the current limiting resistor, the maximum discharge current, in particular, can therefore be preset.

In order to enable, as far as possible, disproportional current limitation in the discharging switch, in particular above the normal temperature, in one expedient embodiment of the disclosure, the NTC thermistor is connected to the control connection of the discharging switch and, in particular, preferably inseparably and, in particular, indirectly to the reference potential. In this case, the NTC thermistor may also be connected (in particular in series) to an "additional resistor" which is used, in particular, to predefine, in particular to set, a temperature threshold, as of which the limitation of the discharge current becomes effective. This additional resistor may be connected between the NTC thermistor and the reference potential. As a result of this connection of the NTC thermistor, the (therefore disproportional) limitation of the control voltage at the control connection of the discharging switch (which may be in the form of an IGBT or MOSFET) and therefore of the discharge current is therefore carried out in the case of heating and therefore increasing conductivity of the NTC thermistor, in particular only above the temperature threshold predefined by the additional resistor. Above the temperature threshold (and therefore independently of the additional resistor), the limitation is likewise optionally carried out in a disproportional or else linear manner, in particular on the basis of the temperature behavior of the NTC thermistor.

In one expedient embodiment, the discharging device, such as the limiting circuit, include a voltage reference, in particular a controllable or at least adjustable voltage reference, for example a controllable Zener diode, which is connected between the control connection of the discharging switch and the reference potential. In addition to its above-described connection to the control connection of the discharging switch, in particular by way of its other connection, the NTC thermistor is also connected to a control input of the voltage reference. On account of the voltage reference, the limiting circuit can be advantageously designed (configured) in an improved manner, in particular precisely and/or in a simple manner. The NTC thermistor, in combination with the additional resistor described above, in this case provides a desired value for the voltage reference (and is therefore also used as a temperature threshold as of which the reduction of the discharge current begins). In this case, the voltage reference may influence the control voltage at the control connection of the discharging switch. In the case of heating of the NTC thermistor, the latter reduces the control voltage at the control connection of the discharging switch, in particular indirectly by utilization of the voltage reference, on account of its increasing conductivity. As a result, the current (discharge current) flowing via the discharging switch is in turn reduced, with the result that the power loss in the discharging switch falls. The temperature of the discharging switch can therefore be held in a temperature range which is not critical for the discharging circuit, in particular with appropriate design of the NTC thermistor, the additional resistor etc. If the discharging switch cools down, the NTC thermistor also cools down as a result of the thermal coupling. As a result, the conductivity of the NTC thermistor falls and the control voltage at the control connection of the discharging switch increases again. As a result, the intended discharging via the discharging switch and the current limiting resistor continues again to the full extent or possibly to an at least greater extent (than in the case of a warmer NTC thermistor). In principle, although it is possible to use the NTC thermistor without the voltage reference, the NTC thermistor would have to be selected to have a comparatively low resistance in this case, which in turn would result in higher (in particular current-related) self-heating of the NTC thermistor.

In an expedient embodiment of the disclosure, which is in particular an alternative to the embodiment described above, the limiting circuit has a second switch. In this case, the NTC thermistor is connected to the control connection of this second switch. In addition, the second switch is connected in such a manner that the control connection of the discharging switch is connected to the reference potential in the fully switched-on (that is to say "connected") state of the second switch. In the fully switched-on state of the second switch—specifically if the discharging switch is in the form of an IGBT or MOSFET—the control voltage at the control connection of the discharging switch therefore falls toward zero or at least to such a low value ("switching value") that the discharging switch opens. In this case, the discharging circuit is "deactivated" or switched off. In an optional variant, the NTC thermistor is also designed and/or is thermally coupled to the discharging switch and/or to the current limiting resistor in such a manner that, with increasing heating and therefore increasing conductivity of the NTC thermistor, a limit value of an assigned second control voltage or possibly of a second control current, which is required for the complete connection of the second switch, is exceeded, in particular. This limit value is also optionally adapted accordingly (in particular by utilization of the choice of the second switch). In this case, a reduction, in particular a switching off, of the control voltage at the control connection of the discharging switch is therefore carried out indirectly by means of the second switch. As a result of the fact that the discharging switch is opened in the case of complete connection of the second switch, the discharging switch and possibly the current limiting resistor can cool down (again) to a non-critical temperature value. On account of the thermal coupling of the NTC thermistor to the discharging switch, the NTC thermistor therefore also cools down, as a result of which its conductivity falls and the second switch is accordingly opened again. As a result, the intended discharging of the electrically operated unit or of the high-voltage network continues via the discharging switch and the current limiting resistor. In an alternative variant, the operating point of the second switch and/or, in particular, the thermal coupling of the discharging switch and/or of the current limiting resistor to the NTC thermistor is/are expediently selected in such a manner that, even with increasing heating and therefore increasing conductivity of the NTC thermistor, the limit value required for the complete connection of the second switch is not exceeded, but rather is only accordingly increasingly approached, in particular. As a result, with increasing heating of the NTC thermistor, the second switch is advantageously in a partially conductive mode (in particular with accordingly increasing conductivity of the second switch), with the result that the control voltage at the control connection of the discharging switch is only partially reduced (preferably above its switching value) and therefore the discharging switch is not completely opened.

In one preferred embodiment, the second switch described above is formed by a field effect transistor, in particular a MOSFET, and is therefore voltage-controlled, in particular. In this case, the NTC thermistor is therefore connected, in particular, to a "gate connection" of the field effect transistor, in particular of the MOSFET.

In each of the embodiments described above, the discharging device has, in one embodiment, a control circuit which in turn includes a circuit configured to reversibly connect the control connection of the discharging switch to the reference potential. In particular, this control circuit is used to keep the discharging switch in its open state and therefore to maintain the intended operation—in particular intended permanent operation—of the high-voltage network or of the electrically operated unit.

In an expedient embodiment, the circuit includes a further (possibly third) switch, in particular a transistor, such as a bipolar transistor. This switch is coupled (in particular on the collector side) to the control connection of the discharging switch. In particular if the limiting circuit includes the second switch, this third switch may be directly coupled to the control connection of the discharging switch. In this case, the third switch is therefore used to directly connect the control connection of the discharging switch to the reference potential.

The control circuit may also include a controller for controlling the circuit, in particular the third switch.

In each of the cases described above, the third switch may be connected for the intended permanent operation, with the result that the discharging switch is open. If the control circuit is switched off or fails, the third switch is therefore opened in any case, and so the discharging switch is advantageously automatically connected and the discharging mode is initiated. As a result, a comparatively fail-safe and, in particular, automatically initiated discharging mode is enabled.

The electrically operated unit according to the may be part of a vehicle and is configured, in particular, for high-voltage operation. The electrically operated unit is therefore part of a high-voltage network described above or itself forms such a high-voltage network. The electrically operated unit according to the disclosure here has the discharging device described above. For example, the electrically operated unit includes a drive motor of the vehicle, an air-conditioning compressor, a coolant or lubricant pump, a water pump, a steering drive or the like. In particular, the electrically operated unit also here includes an energy store, in particular a capacitor, which may be automatically discharged in particular cases (for example accident, repair of the vehicle etc.).

The discharging method according to the disclosure is used to discharge, in particular actively discharge, the electrical (high-voltage) network described above or the electrically operated unit described above. In this case, the discharging method is automatically carried out, in particular, by utilization of the discharging device described above. In this case, the component to be discharged is connected to the reference potential via the current limiting resistor and the discharging switch by utilization of the discharging circuit. In this case, the NTC thermistor thermally coupled to the discharging switch and/or to the current limiting resistor heats up. As a result, the discharge current flowing via the current limiting resistor and the discharging switch is reduced.

The electrically operated unit according to the disclosure and the discharging method according to the disclosure therefore also share the advantages of the discharging device described above.

The conjunction "and/or" should be understood here and below as meaning, in particular, the fact that the features linked by means of this conjunction can be designed both together and as alternatives to one another.

BRIEF DESCRIPTION OF THE DRAWINGS

Exemplary embodiments of the disclosure are explained in more detail below on the basis of a drawing, in which.

Parts which correspond to one another are always provided with the same reference signs in all figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
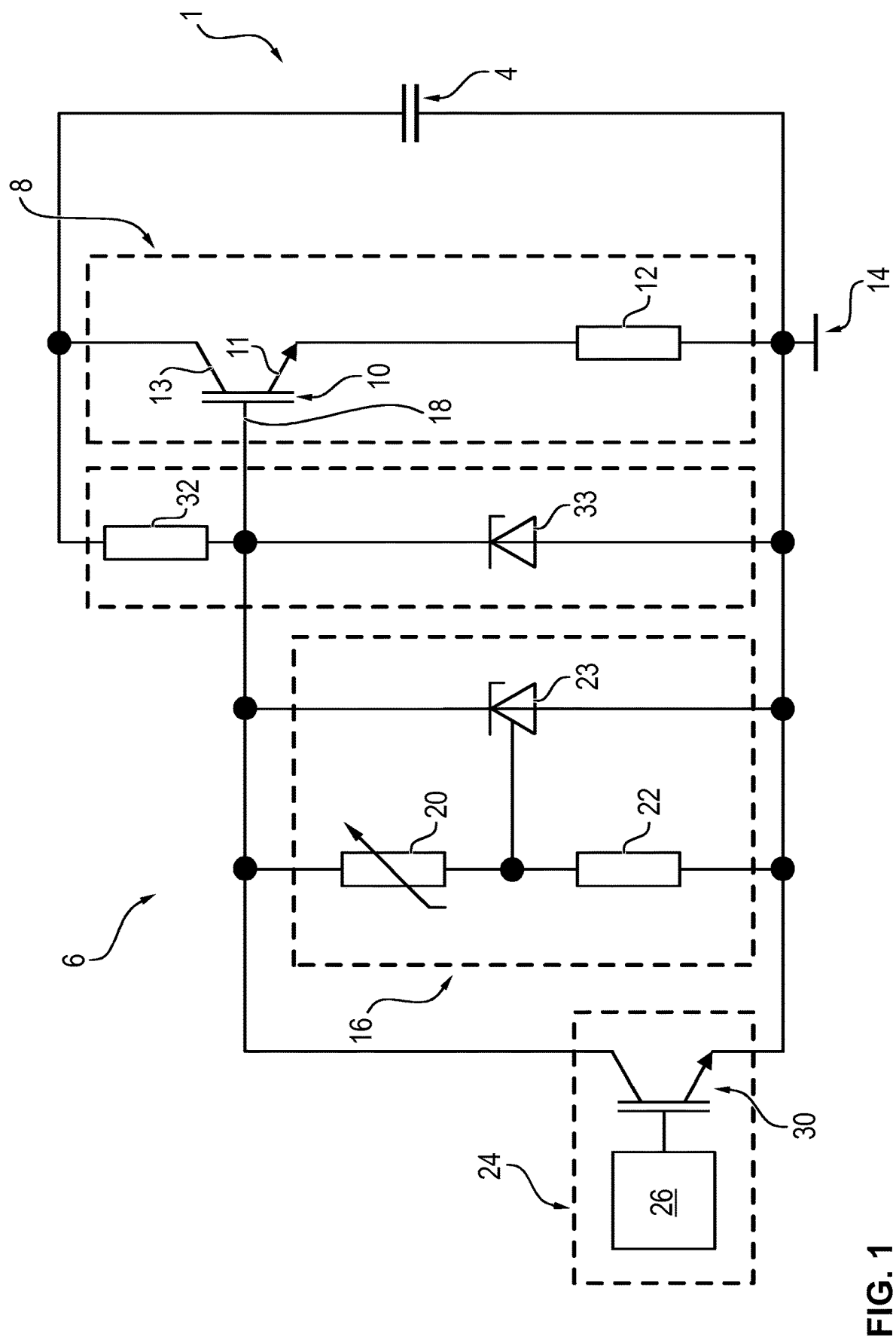
FIG. 1 shows a schematic circuit diagram of a discharging device for an electrically operated unit of a vehicle.

FIG. 1 illustrates a schematic block diagram of a part of an electrical high-voltage network of an electrically operated unit 1. In this case, the electrically operated unit 1 comprises, as components, an electric motor which is not illustrated in any more detail and an energy store which is formed by a capacitor 4 and is intended to stabilize an operating voltage value needed to operate the electric motor. In order to be able to discharge the capacitor 4 in particular cases, the electrically operated unit 1 has a discharging device 6. The discharging device 6 in turn has a discharging circuit 8 which is connected in parallel with the capacitor 4. The discharging circuit 8 has a first switch, referred to as "discharging switch 10", and a current limiting resistor 12 connected in series therewith, that is to say connected to an emitter connection 11 of the discharging switch 10. In this case, the discharging switch 10 is formed by an IGBT. In the closed or "connected" switching state of the discharging switch 10 (therefore in the "discharging mode"), the capacitor 4 is therefore connected to a reference potential, specifically ground potential 14, via the discharging switch 10, specifically its collector connection 13. In the discharging mode, a discharge current therefore flows from the capacitor 4 to the ground potential 14 via the discharging switch 10 and the current limiting resistor 12.

In an alternative exemplary embodiment, the discharging switch 10 is formed by a MOSFET.

In order to prevent the discharging switch 10 from being heated above its load limit on account of the discharge current in the discharging mode and thereby being destroyed, the discharging device 6 also has a limiting circuit 16. In this case, this limiting circuit 16 is connected to a control connection 18 of the discharging switch 10. The limiting circuit 16 has an NTC thermistor 20 which is specifically connected to the control connection 18. The NTC thermistor 20 is also thermally coupled to the discharging switch 10 in a manner which is not illustrated in any more detail. For example, the NTC thermistor 20 is arranged on a housing of the discharging switch 10 for this purpose. The limiting circuit 16 additionally has a further resistor which is referred to as "additional resistor 22" and is connected in series with the NTC thermistor 20, specifically between the latter and ground potential 14. The limiting circuit 16 also has an adjustable voltage reference 23 which is connected in the form of a controllable Zener diode (that is to say a Zener diode with an additional control input) between the control connection 18 and ground potential 14. In this case, a control input of the voltage reference 23 is connected between the NTC thermistor 20 and the additional resistor 22.

The discharging device 6 also has a control circuit 24 which is used to keep the discharging switch 10 in its opened state in the intended operating state of the electrically operated unit 1 and therefore to prevent the discharging of the capacitor 4. For this purpose, the control circuit 24 comprises a controller 26 and circuit means in the form of a further switch, referred to here as "control switch 30", directly or indirectly actuatable (also: switchable) by the controller 26. The control switch 30 is formed by a bipolar transistor (or alternatively by a MOSFET or the like), the control connection of which is connected to the controller 26. In the intended operating state, the controller 26 closes the control switch 30, as a result of which the control connection 18 of the discharging switch 10 is linked to ground potential 14, with the result that the discharging switch 10 is open.

In the discharging mode—that is to say when the control switch 30 is open—the voltage drop across the voltage reference 23 is so high that a voltage (referred to as "control voltage" below) applied to the control connection 18 from the capacitor 4 via a further gate charging resistor 32 (also referred to as "pull-up") exceeds a switching value needed to connect the discharging switch 10, and the discharging switch 10 is therefore turned on. On account of the discharge current flowing via the discharging switch 10 and the current limiting resistor 12, they heat up. On account of the thermal coupling of the discharging switch 10 to the NTC thermistor 20, the NTC thermistor 20 also heats up. As a result, the electrical conductivity of the NTC thermistor 20 increases, as a result of which the voltage across the voltage reference 23 and therefore also the control voltage at the control connection 18 of the discharging switch 10 in turn fall. As a result, the discharge current flowing via the discharging switch 10 is limited, which in turn results in the power loss in the discharging switch 10 and therefore also its heating being reduced (limited). In particular, this controls the "discharging temperature" of the discharging switch 10 which is caused by the discharge current.

The discharging device 6 also has a Zener diode 33 which is connected in parallel with the voltage reference 23. This prevents the control voltage at the control connection 18 of the discharging switch 10 exceeding a maximum value permissible for the discharging switch 10 in the case of low temperature values.

Figure 2:
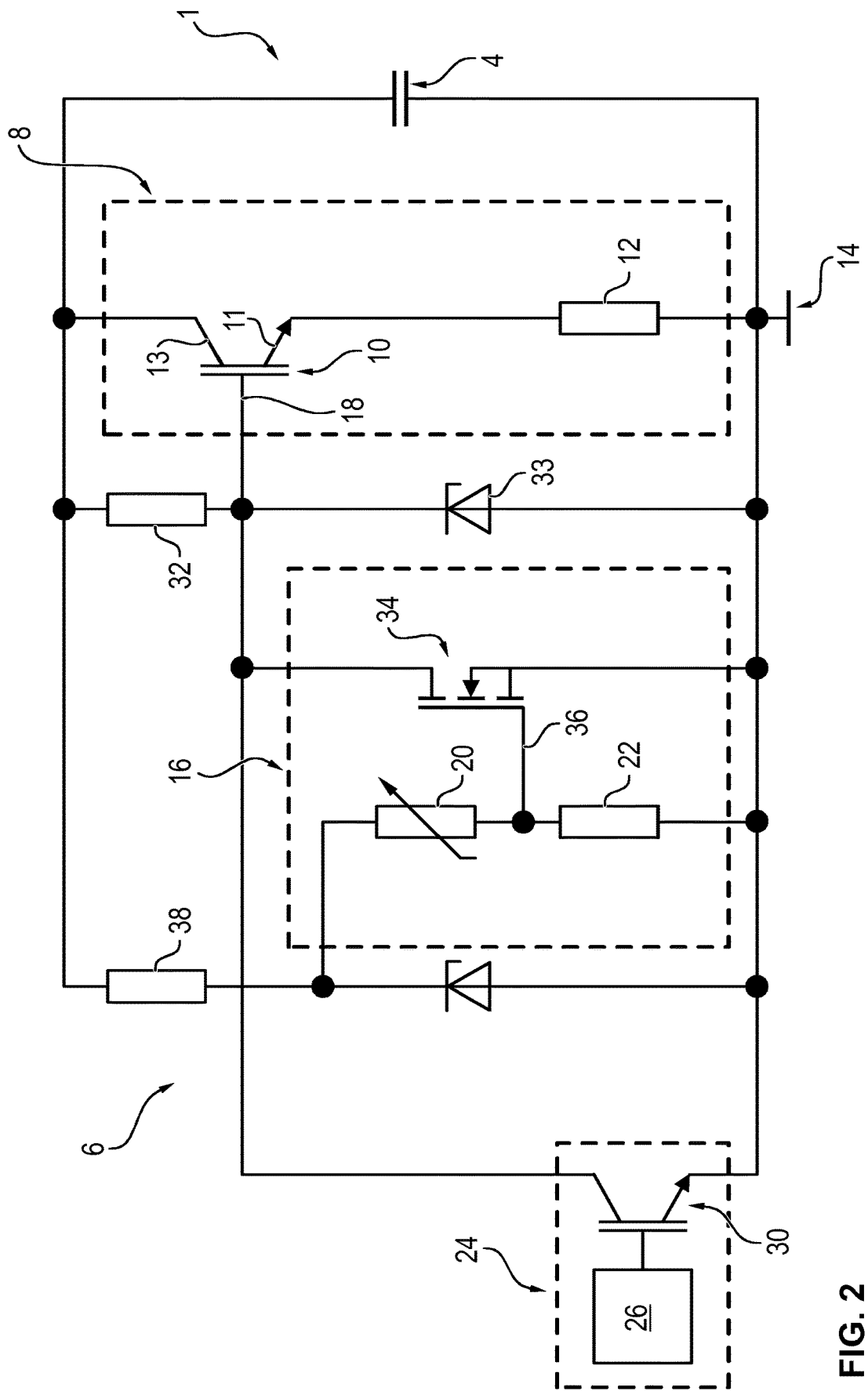
FIG. 2 shows, in a view according to FIG. 1, an alternative exemplary embodiment of the discharging device.

FIG. 2 illustrates an alternative exemplary embodiment of the electrically operated unit 1, specifically the limiting circuit 16 and the control circuit 24. In this exemplary embodiment too, the NTC thermistor 20 of the discharging circuit 16 is thermally coupled to the discharging switch 10. However, the limiting circuit 16 additionally includes a switch which, in the present exemplary embodiment, is in the form of a field effect transistor, specifically a MOSFET 34. In this case, this MOSFET 34 is connected between the control connection 18 of the discharging switch 10 and ground potential 14. In this case, a gate connection 36 of the MOSFET 34 which is used as a control connection is connected between the NTC thermistor 20 and the additional resistor 22. The NTC thermistor 20 is also connected to the capacitor 4 via a further gate charging resistor 38. If the NTC thermistor 20 heats up in the discharging mode, the control voltage at the gate connection 36 of the MOSFET 34 increases on account of the falling resistance of the NTC thermistor 20. If a connection value of the MOSFET 34 is reached, the control connection 18 of the discharging switch 10 is connected to ground potential 14, with the result that the discharging switch 10 is opened again and the discharging of the capacitor 4 is therefore prevented. If the discharging switch 10 and therefore also the NTC thermistor 20 have been sufficiently cooled, the MOSFET 34 is opened again and the discharging switch 10 is therefore closed.

In a further exemplary embodiment, the circuit of which corresponds to the exemplary embodiment illustrated in FIG. 2, the MOSFET 34 and the NTC thermistor 20 are matched in such a manner that, in the case of heating of the NTC thermistor, the connection value for completely connecting the MOSFET 34 is not reached. Rather, in this case, the MOSFET 34 changes to a partially conductive mode during which its conductivity (with increasing heating of the NTC thermistor) also increases further. As a result, the control voltage at the control connection 18 of the discharging switch 10 is only reduced, with the result that the latter does not completely open. Therefore, the discharge current flowing via the discharging switch 10 can also be limited by utilization of the circuit according to FIG. 2, which in turn results in the power loss in the discharging switch 10 and therefore also its heating being reduced (limited).

The subject matter of the disclosure is not restricted to the exemplary embodiments described above. Rather, further embodiments of the disclosure can be derived by a person skilled in the art from the above description. In particular, the individual features of the disclosure described on the basis of the various exemplary embodiments and their configuration variants can also be combined with one another in another manner.

The following is a list of reference numbers shown in the Figures. However, it should be understood that the use of these terms is for illustrative purposes only with respect to

LIST OF REFERENCE SIGNS

1 Electrically operated unit
4 Capacitor
6 Discharging device
8 Discharging circuit
10 Discharging switch
11 Emitter connection
12 Current limiting resistor
13 Collector connection
14 Ground potential
16 Limiting circuit
18 Control connection
20 NTC thermistor
22 Additional resistor
23 Voltage reference
24 Control circuit
26 Controller
30 Control switch
32 Gate charging resistor
33 Zener diode
34 MOSFET
36 Gate connection
38 Gate charging resistor While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. A discharging device configured to discharge an electrical network, comprising:
   a discharging circuit including a current limiting resistor and a first switch configured to connect a component to be discharged of the network or of an electrically operated unit to a reference potential indirectly via the current limiting resistor, and
   a limiting circuit configured to be arranged on a control connection side of the first switch and is intended to limit heating that occurs at the first switch or at the current limiting resistor in a discharging mode, wherein the limiting circuit includes an NTC thermistor that is thermally coupled to the first switch or to the current limiting resistor, wherein the NTC thermistor is connected in such a manner that, in the heated state of the NTC thermistor, a control voltage or a control current needed to connect the discharging switch is directly or indirectly reduced, and wherein the NTC thermistor is connected to a control connection of the first switch.

2. The discharging device of claim 1,
   wherein the first switch is formed by a power transistor, an IGBT, or a MOSFET.

3. The discharging device of claim 1,
   wherein the discharging device includes a voltage reference connected between the control connection of the first switch and the reference potential, wherein the NTC thermistor is also connected to a control input of the voltage reference.

4. A discharging device configured to discharge an electrical network, comprising:
   a discharging circuit including a current limiting resistor and a first switch configured to connect a component to be discharged of the network or of an electrically operated unit to a reference potential indirectly via the current limiting resistor, and
   a limiting circuit configured to be arranged on a control connection side of the first switch and is intended to limit heating that occurs at the first switch or at the current limiting resistor in a discharging mode, wherein the limiting circuit includes an NTC thermistor that is thermally coupled to the first switch or to the current limiting resistor, wherein the NTC thermistor is connected in such a manner that, in the heated state of the NTC thermistor, a control voltage or a control current needed to connect the discharging switch is directly or indirectly reduced, wherein the limiting circuit includes a second switch, to a control connection of which the NTC thermistor is connected, wherein the second switch connects the control connection of the first switch to the reference potential in the fully switched-on state.

5. The discharging device of claim 4,
   wherein the second switch is formed by a field effect transistor.

6. The discharging device of claim 1,
   having a control circuit includes a circuit configured to in order to reversibly connect the control connection of the first switch to the reference potential.

7. The discharging device of claim 6,
   wherein the circuit includes a third switch, in particular a transistor, which is coupled to the control connection of the first switch.

8. An electrically operated unit for a vehicle comprising the discharging device of claim 1.

9. The discharging device of claim 4,
   wherein the first switch is formed by a power transistor, an IGBT, or a MOSFET.

10. The discharging device of claim 4,
    having a control circuit includes a circuit configured to in order to reversibly connect the control connection of the first switch to the reference potential.

11. An electrically operated unit for a vehicle comprising the discharging device of claim 4.

* * * * *